US007387572B2

(12) United States Patent
Hanchar

(10) Patent No.: US 7,387,572 B2
(45) Date of Patent: Jun. 17, 2008

(54) GAMING MACHINE WITH A TRUNNION MOUNTED DISPLAY

(75) Inventor: Peter J. Hanchar, Hoffman Estates, IL (US)

(73) Assignee: WMS Gaming Inc., Waukegan, IL (US)

( * ) Notice: Subject to any disclaimer, the term of this patent is extended or adjusted under 35 U.S.C. 154(b) by 772 days.

(21) Appl. No.: 10/660,271

(22) Filed: Sep. 11, 2003

(65) Prior Publication Data

US 2005/0059496 A1 Mar. 17, 2005

(51) Int. Cl.
*A63F 13/00* (2006.01)

(52) U.S. Cl. .......................................... 463/46; 361/682

(58) Field of Classification Search .................. 463/46; 273/183; 361/681, 682; 348/825; 312/223.2; 248/917; 345/905
See application file for complete search history.

(56) References Cited

U.S. PATENT DOCUMENTS

| | | | | |
|---|---|---|---|---|
| 4,202,015 | A * | 5/1980 | Udo et al. | 348/782 |
| 4,814,759 | A * | 3/1989 | Gombrich et al. | 345/60 |
| 4,832,419 | A * | 5/1989 | Mitchell et al. | 361/681 |
| 5,388,032 | A * | 2/1995 | Gill et al. | 700/17 |
| 5,719,645 | A * | 2/1998 | Saito et al. | 348/818 |
| 5,740,744 | A * | 4/1998 | Nashirozawa et al. | 109/24.1 |
| 5,813,914 | A | 9/1998 | McKay et al. | 463/46 |
| 5,941,615 | A * | 8/1999 | Ito et al. | 312/7.2 |
| 6,068,101 | A | 5/2000 | Dickenson et al. | 194/206 |
| 6,135,884 | A * | 10/2000 | Hedrick et al. | 463/20 |
| 6,164,645 | A | 12/2000 | Weiss | 273/138.2 |
| 6,254,481 | B1 | 7/2001 | Jaffe | 463/20 |
| 6,266,236 | B1 * | 7/2001 | Ku et al. | 361/681 |
| 6,357,712 | B1 * | 3/2002 | Lu | 248/291.1 |
| 6,559,829 | B1 * | 5/2003 | Matsuo et al. | 345/156 |
| 6,560,093 | B1 * | 5/2003 | McLeod et al. | 361/681 |
| 6,623,006 | B2 * | 9/2003 | Weiss | 273/138.2 |
| 6,644,611 | B1 * | 11/2003 | Tai | 248/292.13 |
| 6,665,175 | B1 * | 12/2003 | deBoer et al. | 361/681 |
| 6,820,875 | B1 * | 11/2004 | Hedrick et al. | 273/138.1 |
| 6,962,528 | B2 * | 11/2005 | Yokota | 463/25 |
| 6,976,919 | B2 * | 12/2005 | Cole | 463/46 |
| 7,241,222 | B2 * | 7/2007 | Cole | 463/46 |
| 7,267,613 | B2 * | 9/2007 | Cole | 463/20 |
| 2004/0018870 | A1 * | 1/2004 | Cole | 463/20 |
| 2005/0277477 | A1 * | 12/2005 | Hajder et al. | 463/46 |
| 2006/0154732 | A1 * | 7/2006 | Tastad | 463/46 |

* cited by examiner

*Primary Examiner*—John M. Hotaling, II
*Assistant Examiner*—Damon Pierce
(74) *Attorney, Agent, or Firm*—Nixon Peabody LLP

(57) ABSTRACT

The present invention provides a gaming machine with a trunnion mounted display. In addition to a video display, the trunnion mounted display includes a first trunnion bracket attached to the video display, the first trunnion bracket having a first trunnion disposed thereon at a center horizontal rotating axis of the video display, and having a first hole and a second hole disposed therein. The trunnion mounted display also includes a second trunnion bracket attached to the video display, the second trunnion bracket having a second trunnion disposed thereon at the center horizontal rotating axis, the second trunnion projecting outward from the second trunnion bracket in a horizontal direction opposite the first trunnion. Two trunnion supports having apertures disposed therein to receive the first and second trunnion, and a pull pin mounted in the first trunnion support, enable the trunnion mounted display to be pivoted into a maintenance position.

35 Claims, 7 Drawing Sheets

GAMING MACHINE WITH A TRUNNION MOUNTED DISPLAY

FIELD OF THE DISCLOSURE

The present invention relates generally to gaming machines, and, more particularly, to a gaming machine with a trunnion mounted display.

BACKGROUND

Gaming machines providing games such as electronically driven video slots, video poker, video blackjack, video keno, video bingo, video pachinko, video lottery, and mechanically driven reel slots, etc., are well known in the gaming industry. Generally video gaming machines are configured with a main video display for displaying video game images including video images representing game play outcome (e.g., simulated reel symbols in the case of a slot game, simulated cards, simulated numbers, etc.). Mechanical spinning reel slot machines, on the other hand, generally include a main reel display area configured to allow a player to view a reel symbol array provided by the stopped mechanical spinning reels.

Recently, many video gaming machines and mechanical spinning reel gaming machines began including secondary displays (e.g., a top box video display) to enable a number of game enhancements such as bonus games, interactive tournament games, progressive jackpot games, etc. Such secondary displays are typically implemented as video displays or LED displays; however, mechanical displays (e.g. a wheel, dice) are also utilized.

Whether configured as a video gaming machine with one or more video displays or as a mechanical reel spinning slot machine with an additional video display, operator access to the electrical and mechanical components mounted behind, and on the side of, the video display is desirable. For example, operator access may be required to perform a manual screen adjustment to the video display via a video display controller board mounted on a side of the video display.

Numerous prior art methods of accessing the electrical and mechanical components mounted behind, and on the side of, the video display often require removal of the video display from the gaming machine. Removal of the video display from the gaming machine may result in damage to the video display, damage to the electrical and mechanical components mounted behind, and on the side of, the video display.

SUMMARY OF THE INVENTION

The present invention provides a gaming machine with a trunnion mounted display. In one embodiment, the trunnion mounted display is configured with one pull pin and two holes, and rotates, or pivots about a center horizontal axis. In addition to a video display, the trunnion mounted display includes a first trunnion bracket rigidly attached to a first side panel of the video display, the first trunnion bracket having a first trunnion disposed thereon at a center horizontal rotating axis of the video display and having a first hole and a second hole. The trunnion mounted display also includes a second trunnion bracket rigidly attached to a second side panel of the video display, the second trunnion bracket having a second trunnion disposed thereon at the center horizontal rotating axis of the video display, the second trunnion projecting outward from the second trunnion bracket in a horizontal direction opposite the first trunnion. A first trunnion support is attached to a bottom interior surface of a housing frame characterizing an interior area of the gaming machine to project upward from and perpendicular to the bottom interior surface, the first trunnion support having a first saddle disposed therein, the first saddle sized to receive the first trunnion when the video display is mounted in the housing frame. Similarly, a second trunnion support is attached to the bottom interior surface to project upward from and perpendicular to the bottom interior surface, the second trunnion support having a second saddle disposed therein, the second saddle sized to receive the second trunnion when the video display is mounted in the housing frame. Additionally, a pull pin is mounted in the first trunnion support, the pull pin projecting into the first hole to engage the video display in a game play position, the pull pin projecting into the second hole to engage the video display in a maintenance position allowing operator access to the interior area of the gaming machine.

In another embodiment, the trunnion mounted display is configured with one pull pin and two holes, and pivots about a center vertical axis. In addition to a video display, the trunnion mounted display includes a first trunnion bracket rigidly attached to a top panel of the video display, the first trunnion bracket having a first trunnion disposed thereon at a center vertical rotating axis of the video display and having a first hole and a second hole. The trunnion mounted display also includes a second trunnion bracket attached to a bottom panel of the video display, the second trunnion bracket having a second trunnion disposed thereon at the center vertical rotating axis of the video display, the second trunnion projecting outward from the second trunnion bracket in a vertical direction opposite the first trunnion. A first trunnion support is attached to a side interior surface of a housing frame characterizing an interior area of the gaming machine to project sideways from and perpendicular to the side interior surface, the first trunnion support having a first enclosed aperture disposed therein, the first enclosed aperture sized to receive the first trunnion when the video display is mounted in the housing frame. Similarly, a second trunnion support is attached to the side interior surface to project sideways from and perpendicular to the side interior surface, the second trunnion support having a second enclosed aperture disposed therein, the second enclosed aperture sized to receive the second trunnion when the video display is mounted in the housing frame. The second trunnion support is preferably a bearing pocket having an inner race and an outer race separated by a plurality of ball rollers. Additionally, a pull pin is mounted in the first trunnion support, the pull pin projecting into the first hole to engage the video display in a game play position, the pull pin projecting into the second hole to engage the video display in a maintenance position allowing operator access to the interior area of the gaming machine.

In yet another embodiment, the trunnion mounted display is configured with two pull pins and one hole, and pivots about the center horizontal axis, and in a further embodiment, the trunnion mounted display is configured with two pull pins and one hole, and pivots about the center vertical axis.

Additional aspects of the invention will be apparent to those of ordinary skill in the art in view of the detailed description of various embodiments, which is made with reference to the drawings, a brief description of which is provided below.

DESCRIPTION OF THE PREFERRED EXAMPLES

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

In general, the present invention provides a gaming machine with a trunnion mounted display that pivots about a vertical or horizontal center axis of the display to allow operator access to the electrical and mechanical components mounted behind, and on the side of the display.

As described below, the present invention is preferably implemented using a liquid crystal display (LCD) or other flat panel video display found in a gaming machine. It is contemplated that the present invention may also be implemented using a CRT or other non-flat panel video display device.

An advantageous feature of the invention is easy operator access to the interior of the gaming machine, behind the display, without removal of the display from the gaming machine. Another advantageous feature of the invention is easy operator access to the sides and back of the display without removal of the display from the gaming machine.

Figure 1:
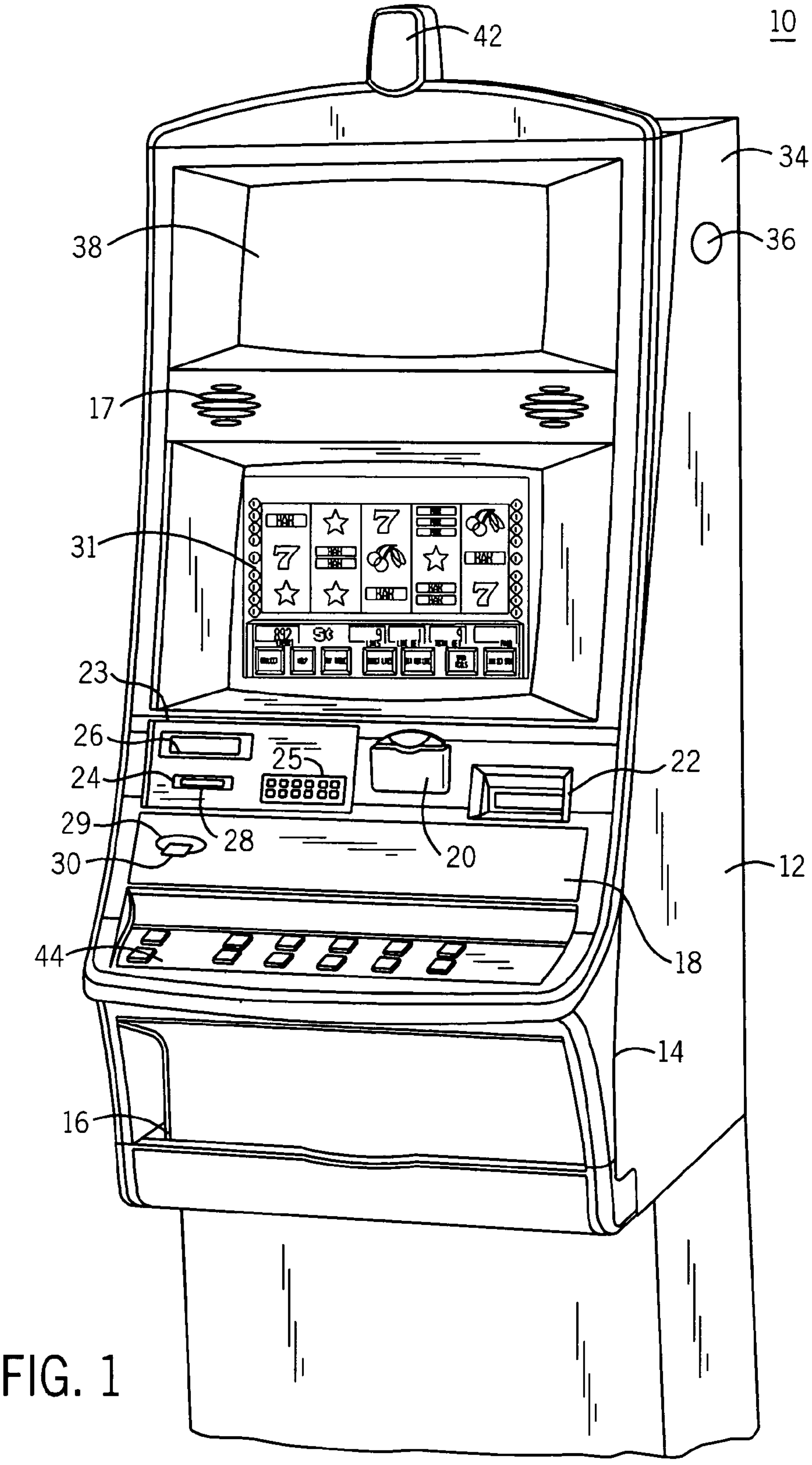
FIG. 1 is a perspective view of an embodiment of a gaming machine having a trunnion mounted secondary display in accordance with an embodiment of the invention.

FIG. 1 is a perspective view of an exemplary gaming machine 10 having a trunnion mounted video display in accordance with an embodiment of the invention. The gaming machine 10 may be any type of wagering gaming machine with a video display or other components requiring removal to gain interior access and therefore may have varying structures and methods of operation. For exemplary purposes, various elements of the gaming machine 10 are described below, but it should be understood that numerous other elements may exist and may be utilized in any number of combinations to create a variety of gaming machine types.

Referring to FIG. 1, the gaming machine 10 includes a cabinet 12 having a door 14 to provide access to the video display(s) and to provide access to some of the components located in the interior of the gaming machine 10. Attached to the door 14 are audio speaker(s) 17 and a belly glass area 18 that typically displays game theme artwork. Also attached to the door 14 are a number of value input devices such as a coin slot acceptor 20 or a note acceptor 22 that allow a patron to insert value for game play. The gaming machine 10 may also include a player tracking area 23 having the card reader 24, a keypad 25 and a card reader display 26. The display 26 may be implemented using a vacuum fluorescent display (VFD), an LCD, an LED display, a dot matrix alphanumerical display, and/or a touch screen to display information to a game patron or casino employee.

The gaming machine 10 also includes a main display device 31 configured with a video display for displaying video game images, including game outcome, associated with the wagering game play (e.g., simulated reel symbols in the case of a slot game, simulated cards, simulated numbers, animation, 2-D images, 3-D images or digital video playback, etc.). Such a video display may be implemented as a flat panel cathode ray tube, a plasma display, an LCD, an organic liquid crystal display or other type of video display suitable for use in a gaming machine, and may be configured with or without a touch screen. Alternatively, the main display device 31 may include a main reel display area having multiple windows configured to allow a player to view a reel symbol array provided by stopped mechanical spinning reels of a mechanical spinning reel slot machine.

Figure 2:
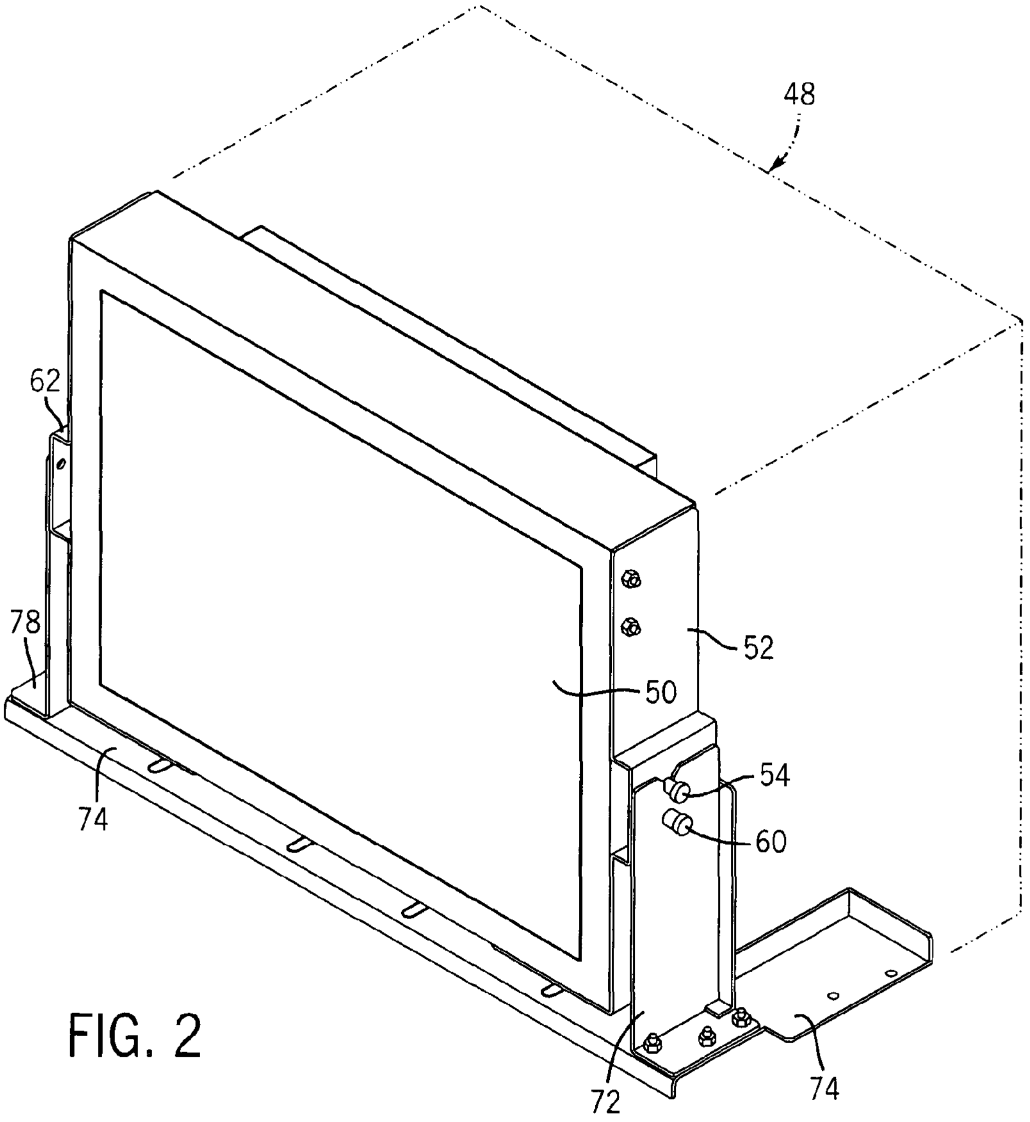
FIG. 2 is a more detailed view of an embodiment of the trunnion mounted secondary display of FIG. 1.

The gaming machine 10 may also include a top box 34 defined by a top box housing frame 48 characterizing a top box interior area of the gaming machine (see. FIG. 2). Preferably, the top box housing frame 48 is enclosed within the cabinet 12 and includes a top interior surface, a bottom interior surface, a first side interior surface, a second side interior surface, and a back interior surface. Various electrical and mechanical components may be mounted on the interior surfaces within the top box housing frame 48. A trunnion mounted secondary display 38 occupies a front portion of the top box housing frame 48 and video images associated therewith are viewable through a glass plate (not separately illustrated) provided on the door 14.

As described below in connection with FIG. 2, the configuration of the trunnion mounted secondary display 38 allows easy operator access to the side and back surfaces of the trunnion mounted secondary display 38 and to the interior of the top box housing frame 48. The trunnion mounted secondary display 38 preferably includes a flat panel video display 50. It should be appreciated that other displays such as a flat panel cathode ray tube, a plasma display, an LCD, an organic liquid crystal display, a dot matrix alphanumerical display or other type of video display suitable for use in a gaming machine, may also be used. Operation of the trunnion mounted secondary display 38 during game play enables a number of game play enhancements such as bonus games, interactive tournament games, progressive jackpot games, etc.

The gaming machine 10 also includes the player control panel 44 having a number of pushbuttons or touch-sensitive areas (i.e., touch screen) that may be pressed by a player to select games, make wagers, make gaming decisions, etc. In the case of a mechanical spinning reels slot machine, the player control panel 44 may also include a number of wager selection buttons that allow a patron to select a number of pay lines, to specify a wager amount for each pay line selected, etc.

When a player inserts value in the gaming machine 10, credits corresponding to the amount deposited are displayed on a credit meter of the gaming machine 10. After depositing the appropriate amount of value and making appropriate selections, the player begins game play by pulling a mechanical arm or by pushing an appropriate button such as a Bet button, a Max Bet button, or a Play button on the player control panel 44. Subsequent game play outcome displayed via the main display device 31 may be determined either centrally or locally (1) using a random number generator (RNG) resulting in a pseudo random set of outcomes, or (2) by selecting a game outcome from a fixed set of outcomes (pooled), or (3) other suitable technique.

Figure 3:
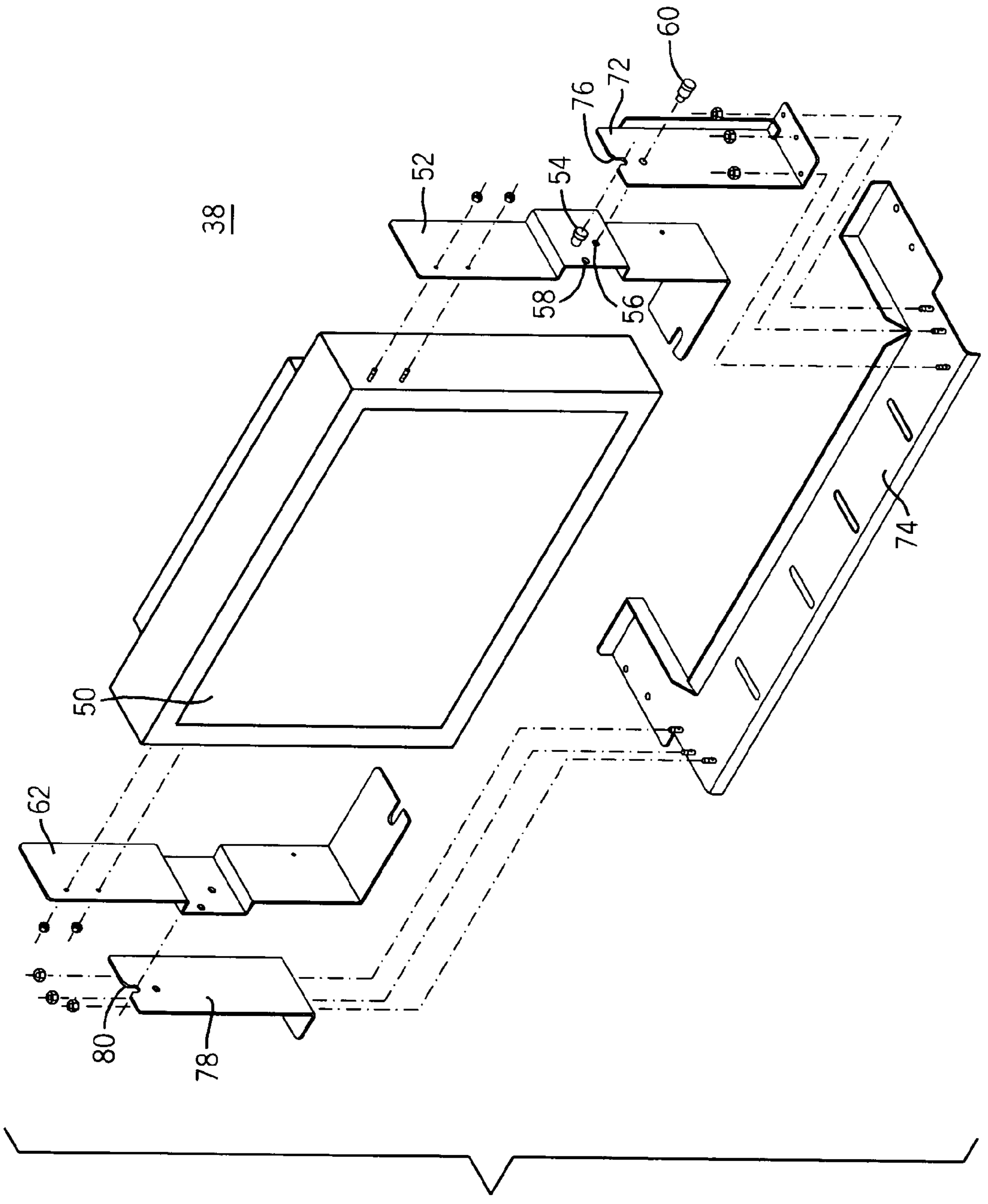
FIG. 3 is an exploded view of the trunnion mounted secondary display shown in FIG. 2.
Figure 4:
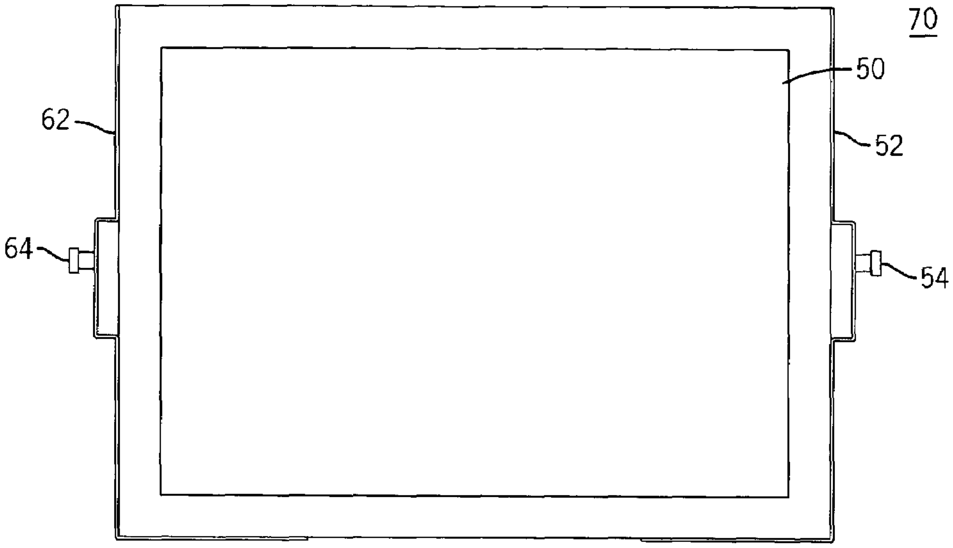
FIG. 4 is a front view of a bracketed video display of the trunnion mounted secondary display shown in FIG. 2.

FIG. 2 is a more detailed view of an embodiment of the trunnion mounted secondary display 38 in accordance with the invention. FIG. 3 is an exploded view of the trunnion mounted secondary display 38. It should be understood that although the trunnion mounting is associated with the trunnion mounted secondary display 38, the trunnion mounting may also be associated with any other display devices or other similar components of the gaming machine 10 traditionally requiring removal to gain gaming machine interior access.

Figure 6:
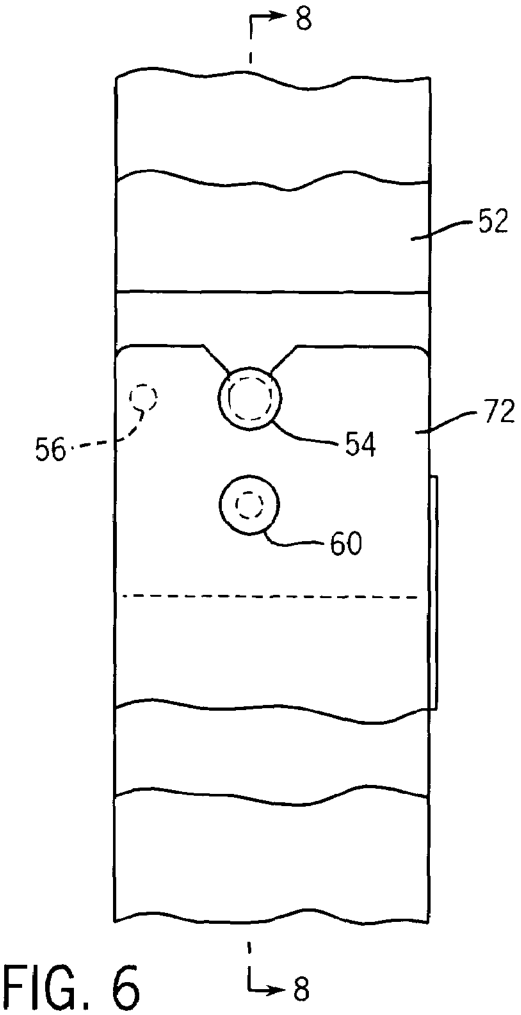
FIG. 6 is a partial side view of the trunnion mounted secondary display in a game play position.
Figure 7:
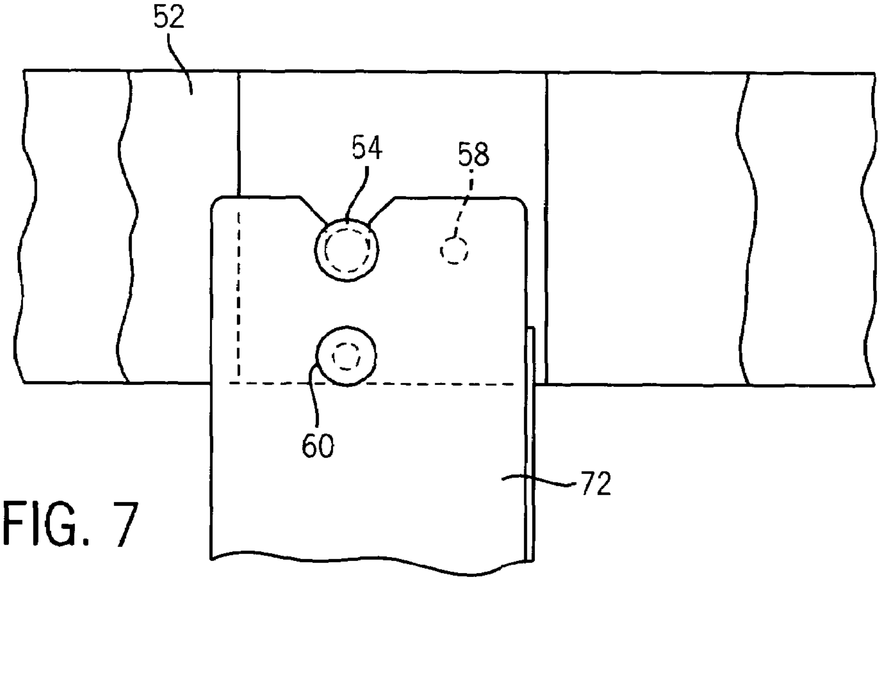
FIG. 7 is a partial side view of the trunnion mounted secondary display in a maintenance position.
Figure 8:
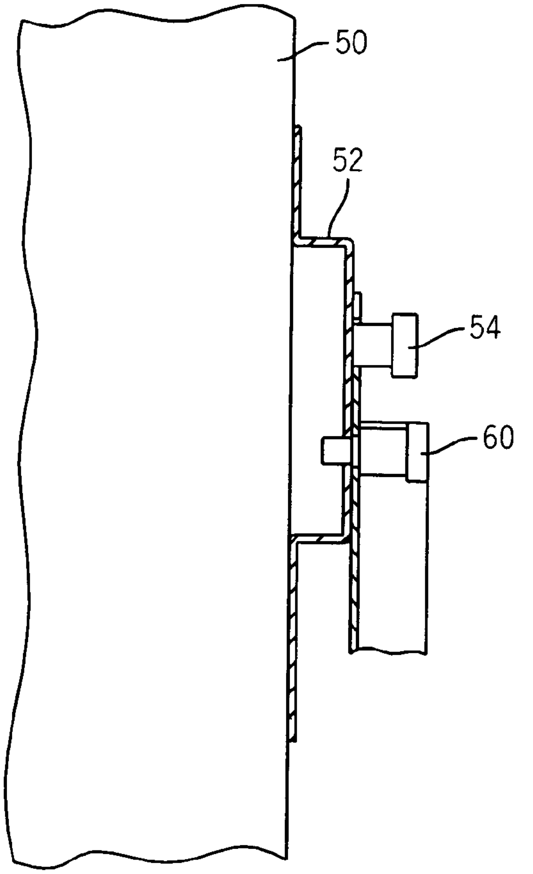
FIG. 8 is a cross section view of the trunnion mounted secondary display of FIG. 6.
Figure 9:
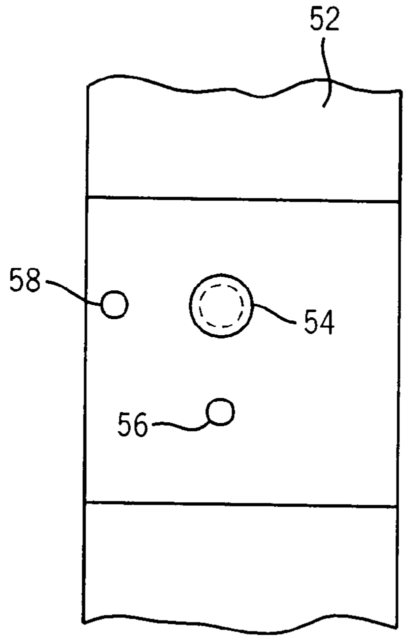
FIG. 9 is a partial side view of a trunnion bracket of the trunnion mounted secondary display shown in FIG. 2.

In addition to the video display 50, the trunnion mounted secondary display 38 preferably includes a first trunnion bracket 52 rigidly attached to a first side panel of the video display 50. The first trunnion bracket 52 is sized to substantially match the size of the first side panel of the video display. A first trunnion 54 is attached to the first trunnion bracket 52 at a center horizontal rotating axis of the video display 50. In addition, the first trunnion bracket 52 includes a first hole 56 and a second hole 58 (see, FIGS. 6, 7, 9). The first hole 56 is preferably located at a calculated distance (e.g., 2.5 centimeters) directly below the first trunnion 54. The location of the second hole 58 is equidistant from the first trunnion 54, but located ninety degrees from the first hole 56 to enable receipt of a pull pin 60 when the video display 50 is rotated, or pivoted, from a game play position to a maintenance position. The calculated distance for placement of the first and second holes 56, 58 is based on the width dimension of the first trunnion bracket 52 and the size of the pull pin 60.

The trunnion mounted secondary display 38 also includes a second trunnion bracket 62 rigidly attached to a second side panel of the video display 50. The second trunnion bracket 62 is sized to substantially match the size of the second side panel of the video display 50 and includes a second trunnion 64 attached thereto, the second trunnion 64 projecting outward from the center horizontal rotating axis of the video display 50. Thus, a bracketed video display 70, illustrated in FIG. 3, is formed having two trunnions extending outward in opposite directions from the center horizontal rotating axis of the video display 50.

Two trunnion supports are provided to receive the bracketed video display 70. The first trunnion support 72 is coupled to the bottom interior surface of the top box housing frame 48. Alternatively, the first trunnion support 72 may be attached to a trunnion base 74 affixed to a front portion of the bottom interior surface. The first trunnion support 72 is perpendicular to the bottom interior surface and therefore projects upward from the bottom interior of the top box housing frame 48. A first saddle 76, disposed in a top portion of the first trunnion support 72, is sized to receive the first trunnion 54 when the bracketed video display 70 is mounted in the top box housing frame 48. Therefore, the length of the first trunnion support 72 and location of the saddle 76 is based on the size of the video display 50.

Similarly, the second trunnion support 78 is coupled to the bottom interior surface of the top box housing frame 48. Alternatively, the second trunnion support 78 may be attached to the trunnion base 74 if the first trunnion support 72 is attached to the trunnion base 74. The second trunnion support 78 is perpendicular to the bottom interior surface and therefore projects upward from the bottom interior of the top box housing frame 48. A second saddle 80, disposed in a top portion of the second trunnion support 78, is sized to receive the second trunnion 64 when the bracketed video display 70 is mounted in the top box housing frame 48. Thus, when the two trunnions extending outward from the bracketed video display are "dropped" into their respective saddles 76, 80 of the first and second trunnion supports 72, 78, the bracketed video display 70 can rotate freely about its center horizontal rotating axis.

It should be understood, that although saddles 76, 80 are used to receive the first and second trunnions 54, 64 respectively, other trunnion receiving means may be utilized. Other trunnion receiving means may include using different shapes such as slots, holes, grooves, etc. or any other suitable aperture disposed in the first and second trunnion supports 72, 78 or may include using different support configurations anchored to different areas within the gaming machine 10.

To control rotation of the bracketed video display, the pull pin 60 is mounted on the first trunnion support 72 at a location such that when the trunnion mounted secondary display 38 is in a game play position, the pull pin 60 projects into the first hole 56. The pull pin 60 projecting into the first hole 56 "locks" the trunnion mounted secondary display 38 into the game play position.

Similarly, to lock the trunnion mounted secondary display 38 in a maintenance position, (1) the pull pin 60 is manually disengaged from the first hole 56, (2) the trunnion mounted secondary display 38 is rotated or pivoted ninety degrees about its center horizontal axis, preferably to the allow the screen side to face in a downward position, and (3) the pull pin 60 is released into the second hole 58.

Figure 5:
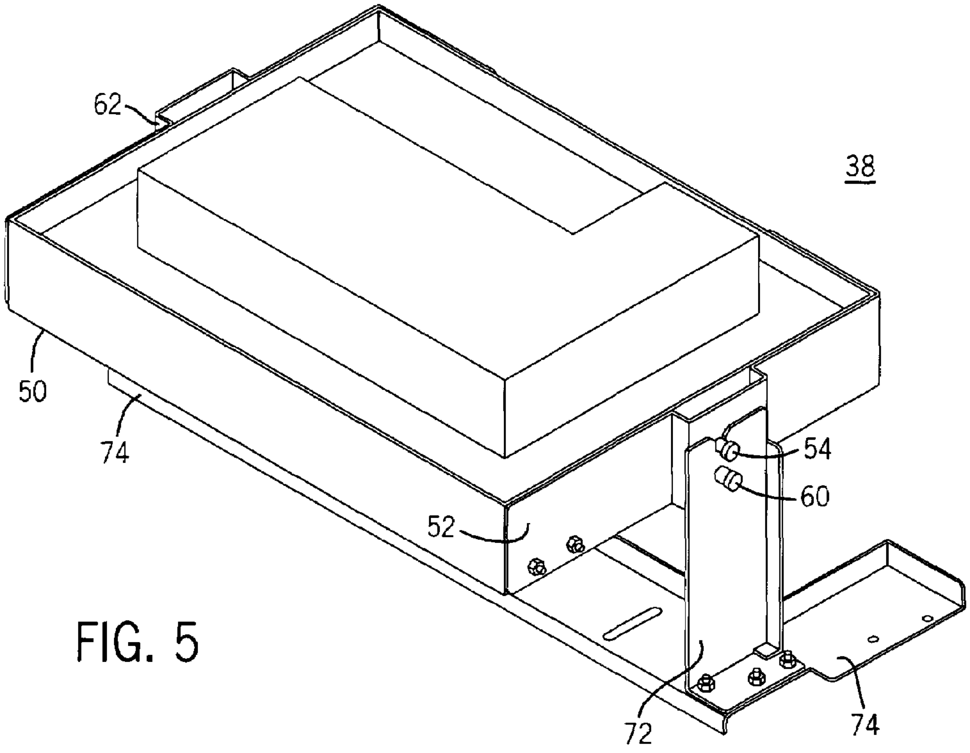
FIG. 5 is a perspective view of the trunnion mounted secondary display shown in FIG. 2 in a maintenance position in accordance with the invention.

FIG. 5 is a perspective view of the trunnion mounted secondary display 38 in a maintenance position in accordance with the invention. The maintenance position allows operator access to the interior area of the gaming machine. The maintenance position also allows operator access to the back and sides of the trunnion mounted secondary display 38.

Although not separately illustrated, the trunnion mounted secondary display 38 may also be configured to rotate about its center vertical rotating axis using substantially similar elements to those described in connection with rotation about the center horizontal rotating axis. Rather than being rigidly attached to the first side panel, the first trunnion bracket 52 is rigidly attached to a top panel of the video display 50. The first trunnion 54 is attached to the first trunnion bracket 52 at a center vertical rotating axis of the video display 50. Preferably, the first hole 56 is located at a calculated distance directly next to the first trunnion 54 (e.g., 2.5 centimeters next to the first trunnion 54). The second hole 58 is located either in front of or behind the first trunnion 54 at the same calculated distance, but at a location ninety degrees from the first hole 56.

Similarly, rather than being rigidly attached to the second side panel, the second trunnion bracket 62 is rigidly attached to a bottom panel of the video display 50. The second trunnion bracket 62 includes the second trunnion 64 attached thereto, the second trunnion 64 projecting outward from the center vertical rotating axis of the video display 50. Thus, a bracketed video display is formed having two trunnions extending outward in opposite directions from the center vertical rotating axis of the video display 50.

In addition, rather than being mounted to the bottom interior surface of the top box housing frame 48, the first trunnion support 72 is mounted to a side interior surface of the top box housing frame 48 and therefore projects sideways from the top box housing frame 48. A first aperture, disposed in a top portion of the first trunnion support 72, is sized to receive the first trunnion 54 when the bracketed video display is mounted in the top box housing frame 48. Similarly, the second trunnion support 78 is mounted to the side surface and includes a second aperture sized to receive the second trunnion 64 when the bracketed video display is mounted in the top box housing frame 48. To bear the weight of the trunnion mounted video display 38, the second trunnion 72 support preferably comprises a bearing pocket having an inner race and an outer race separated by a plurality of ball rollers. The inner race allows the video display to pivot around the center vertical rotating axis when the pull pin 60 is disengaged from the first trunnion bracket 52. Therefore, unlike the saddles 76, 80 of the horizontally rotating trunnion mounted secondary display 38, each of the first and second apertures must form an enclosed space to retain the first and second trunnions 54, 64.

Again, the pull pin 60 is mounted on the first trunnion support 72 at a location such that when the trunnion mounted secondary display 38 is in a game play position, the pull pin projects into the first hole 56. Similarly, to lock the trunnion mounted secondary display 38 in a maintenance position, (1) the pull pin 60 is manually disengaged from the first hole 56, (2) the trunnion mounted secondary display 38 is rotated, or pivoted, ninety degrees about its center vertical axis, and (3) the pull pin 60 is released into the second hole 58.

The trunnion mounted secondary display 38 may also be configured with two pull pins to enable pivoting about a center horizontal rotating axis or about a center vertical rotating axis. In both instances, the first the first trunnion bracket 52 includes only one hole, and the first trunnion support includes both a first pull pin and a second pull pin.

Figure 10:
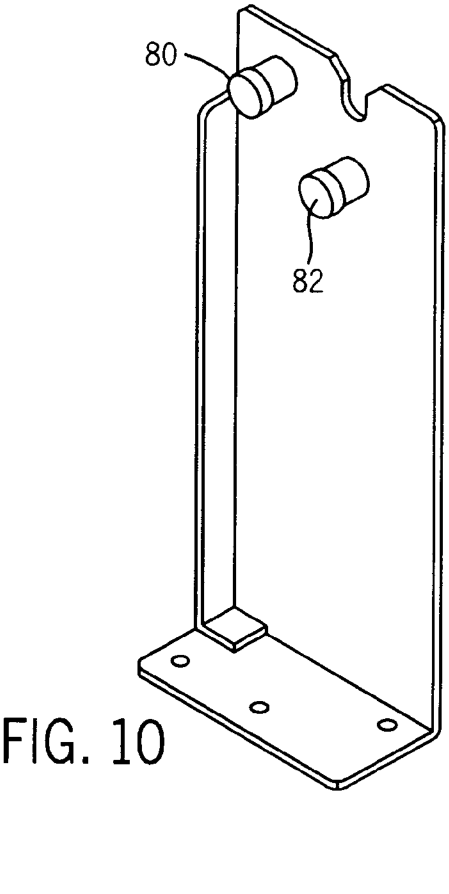
FIG. 10 is a perspective view of a trunnion bracket having two pull pins in accordance with another embodiment of the invention.

FIG. 10 is a perspective view of a trunnion bracket having two pull pins in accordance with another embodiment of the invention. The first pull pin 80 is located at a predetermined distance from the first saddle (for horizontal rotation) or the first enclosed aperture (for vertical rotation), and the second pull pin 82 is located at the predetermined distance, ninety degrees from the first pull pin. For rotation about the center horizontal rotating axis, when the trunnion mounted secondary display 38 is in a game play position, the first pull pin projects into the hole. The first pull pin projecting into the hole "locks" the trunnion mounted secondary display 38 into the game play position. To lock the trunnion mounted secondary display 38 in a maintenance position, (1) the first pull pin is manually disengaged from the hole, (2) the trunnion mounted secondary display 38 is rotated or pivoted ninety degrees about its center horizontal axis, preferably to the allow the screen side to face in a downward position, and (3) the second pull pin is released into the hole.

Figure 11:
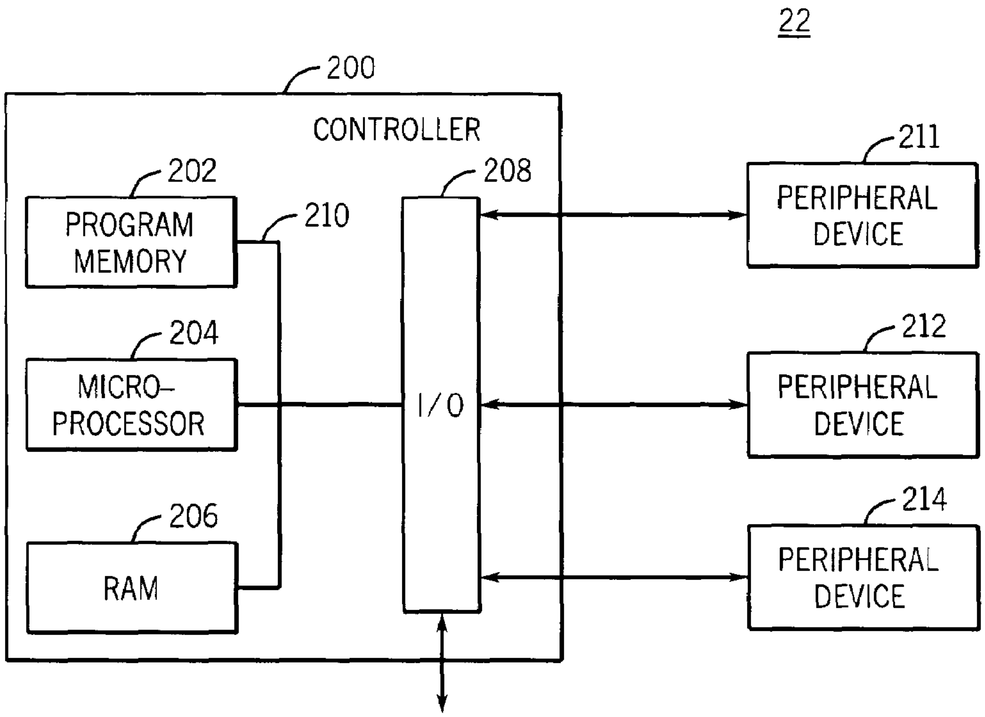
FIG. 11 is a block diagram of the electronic components of the gaming machine having a trunnion mounted secondary display of FIG. 1.

FIG. 11 is a block diagram of a number of components that may be incorporated in the gaming machine 10 of FIG. 1. Referring to FIG. 1, the gaming machine 10 includes a controller 200 that may comprise a program memory 202, a microcontroller-based platform or microprocessor (MP) 204, a random-access memory (RAM) 206 and an input/output (I/O) circuit 208, all of which may be interconnected via a communications link, or an address/data bus 210. The microprocessor 204 is capable of controlling the display of images, symbols and other indicia such as characters, people, places, things, and faces of cards to be displayed. The RAM 206 is capable of storing event data (e.g., coins-in, coins-out, games played, amount spent) or other data used or generated during game play. The program memory 202 is capable of storing program code which controls the gaming machine. Although the program memory is preferably implemented as a non-volatile read only memory (ROM), it could also be a flash or battery backed RAM in order for the program memory 202 to be updated by a coupled server or floor controller.

It should be appreciated that although only one microprocessor 204 is shown, the controller 200 may include multiple microprocessors 204. For example, the controller 200 may include one microprocessor for executing low level functions and another processor for executing higher level functions such as some communications, security, maintenance, etc. Similarly, the memory of the controller 200 may include multiple RAMs 206 and multiple program memories 202. Although the I/O circuit 208 is shown as a single block, it should be appreciated that the I/O circuit 208 may include a number of different types of I/O circuits. The RAM(s) 206 and program memory(s) 202 may be implemented as semiconductor memories, magnetically readable memories, and/or optically readable memories, etc. Further, the term "controller" is used herein to refer collectively to the program memory 202, the microprocessor 204, the RAM 206 and the I/O circuit 208.

FIG. 11 illustrates that multiple peripheral devices, depicted as peripheral devices 211, 212, and 214, may be operatively coupled to the I/O circuit 208. The peripheral devices may include the player control panel 44 with buttons, a coin slot acceptor 20, a note acceptor 22, a bill validator, a keypad, a sound circuit driving speakers, the card reader 24, the card reader display 26, the main display device 31, the secondary display device 38, touch screen.

It should be appreciated that although the controller 200 is a preferable implementation of the present invention, the present invention also includes implementation via one or more application specific integrated circuits (ASICs), field programmable gate arrays (FPGAs), adaptable computing integrated circuits, one or more hardwired devices, or one or more mechanical devices.

As may be apparent from the discussion above, the present invention provides a gaming machine with a trunnion mounted display that pivots about a vertical or horizontal center axis of the display to allow operator access to the electrical and mechanical components mounted behind, and on the side of the display From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

The invention claimed is:

1. A gaming machine for playing a wagering game, comprising:

a video display assembly having a first side panel and a second side panel, the first side panel having a first hole and a second hole disposed therein, the second side panel being substantially parallel to the first side panel, the video display assembly including a video display located between the first side panel and the second side panel, the video display for displaying images associated with the wagering game;

a first trunnion attached to the first side panel of the video display assembly;

a second trunnion attached to the second side panel of the video display assembly;

a first trunnion support configured to receive the first trunnion, the first trunnion support coupled to a first interior surface of the gaming machine;

a second trunnion support configured to receive the second trunnion, the second trunnion support coupled to a second interior surface of the gaming machine; and a pull pin mounted in the first trunnion support, the pull pin configured to project into the first hole to engage the video display assembly in a game play position while the wagering game is being played and the video display is in operation, the pull pin configured to project into the second hole to engage the video display assembly in a maintenance position allowing operator access to an interior area of the gaming machine.

2. The gaming machines of claim 1, wherein the first trunnion is attached to the first side panel at a center horizontal rotating axis of the video display assembly, and wherein the second trunnion is attached to the second side panel at the center horizontal rotating axis, the second trunnion projecting in a horizontal direction opposite the first trunnion.

3. The gaming machine of claim 1, wherein the first trunnion support includes a first aperture sized to receive the first trunnion, and the second trunnion support includes a second aperture sized to receive the second trunnion.

4. The gaming machine of claim 1, wherein the first hole is located at a calculated distance from the first trunnion, and wherein the second hole is located at the calculated distance from the first trunnion ninety degrees from the first hole.

5. The gaming machine of claim 4, wherein the calculated distance is based on a size of the first side panel.

6. The gaming machine of claim 1, wherein the gaming machine further comprises a trunnion base attached to the interior surface, and wherein the first trunnion support and the second trunnion support are rigidly attached to the trunnion base.

7. The gaming machine of claim 1, wherein the video display assembly is pivoted ninety degrees around the center horizontal rotating axis after the pull pin is disengaged from the first hole to allow the pull pin to project into the second hole.

8. The gaming machine of claim 1, wherein the video display assembly is selected from the group consisting of a flat panel cathode ray tube assembly, a plasma display assembly, a liquid crystal display assembly and an organic liquid crystal display assembly.

9. The gaming machine of claim 1, further comprising a controller operatively coupled to the video display and a value input device of the gaming machine, the controller comprising a processor and a memory coupled to the processor of the controller, the controller being programmed to:

detect a wager for game play at the gaming machine;

cause a video image representing an outcome of the game play to be displayed on the video display; and determine a value payout associated with the outcome.

10. The gaming machine of claim 1, wherein the gaming machine is selected from the group consisting of a mechanical slot machine, a video slot machine, a video poker machine, a video blackjack machine, a video keno machine and a video bingo machine.

11. A gaming machine with a trunnion mounted video display, the gaming machine comprising:

a housing frame including an interior area of the gaming machine, the housing frame having a bottom interior surface;

a video display having a front panel, the front panel displaying video images associated with a wagering game at the gaming machine;

a first trunnion bracket rigidly attached to a first side panel of the video display, the first trunnion bracket having a first trunnion disposed thereon at a center horizontal rotating axis of the video display and having a first hole and a second hole disposed therein;

a second trunnion bracket rigidly attached to a second side panel of the video display, the second trunnion bracket having a second trunnion disposed thereon at the center horizontal rotating axis, the second trunnion projecting outward from the second trunnion bracket in a horizontal direction opposite the first trunnion, the second side panel substantially parallel to the first side panel, the video display being between the first and second trunnion brackets;

a first trunnion support coupled to the bottom interior surface, the first trunnion support having a first saddle disposed therein, the first saddle sized to receive the first trunnion when the video display is mounted in the housing frame;

a second trunnion support coupled to the bottom interior surface, the second trunnion support having a second saddle disposed therein, the second saddle sized to receive the second trunnion when the video display is mounted in the housing frame; and a pull pin mounted in the first trunnion support, the pull pin projecting into the first hole to engage the video display in a game play position while the wagering game is being played and the video display is in operation, the pull pin projecting into the second hole to engage the video display in a maintenance position allowing operator access to the interior area.

12. The gaming machine of claim 11, wherein the first hole is located at a calculated distance from the first trunnion, and wherein the second hole is located at the calculated distance from the first trunnion ninety degrees from the first hole.

13. The gaming machine of claim 12, wherein the calculated distance is based on a size of the first trunnion bracket.

14. The gaming machine of claim 11, wherein the gaming machine further comprises a trunnion base attached to a portion of the bottom interior surface, and wherein the first trunnion support and the second trunnion support are rigidly attached to the trunnion base.

15. The gaming machine of claim 11, wherein the video display is pivoted ninety degrees around the center horizontal rotating axis after the pull pin is disengaged from the first hole to allow the pull pin to project into the second hole.

16. The gaming machine of claim 11, wherein the video display is selected from the group consisting of a flat panel cathode ray tube, a plasma display, a liquid crystal display and an organic liquid crystal display.

17. The gaming machine of claim 11, further comprising a controller, the controller operatively coupled to the video display and a value input device of the gaming machine, the controller comprising a processor and a memory coupled to the processor of the controller, the controller being programmed to:

detect a wager for game play at the gaming machine;

cause a video image representing an outcome of the game play to be displayed on the video display; and determine a value payout associated with the outcome.

18. The gaming machine of claim 11, wherein the gaming machine is selected from the group consisting of a mechanical slot machine, a video slot machine, a video poker machine, a video blackjack machine, a video keno machine and a video bingo machine.

19. A gaming machine with a trunnion mounted video display, the gaming machine comprising:

a video display having a front panel, the front panel displaying video images associated with a wagering game at the gaming machine;

a first trunnion bracket attached to a top panel of the video display, the first trunnion bracket having a first trunnion disposed thereon at a center vertical rotating axis of the video display and having a first hole and a second hole disposed therein;

a second trunnion bracket attached to a bottom panel of the video display, the second trunnion bracket having a second trunnion disposed thereon at the center vertical rotating axis, the second trunnion projecting outward from the second trunnion bracket in a vertical direction opposite the first trunnion, the top panel substantially parallel to the bottom pane, the video display being between the first and second trunnion brackets;

a first trunnion support coupled to a side interior surface of a housing frame characterizing an interior area of the gaming machine, the first trunnion support having a first enclosed aperture disposed therein, the first enclosed aperture sized to receive the first trunnion when the video display is mounted in the housing frame;

a second trunnion support coupled to the side interior surface, the second trunnion support having a second enclosed aperture disposed therein, the second enclosed aperture sized to receive the second trunnion when the video display is mounted in the housing frame; and a pull pin mounted in the first trunnion support, the pull pin projecting into the first hole to engage the video display in a game play position while the wagering gaming is being played and the video display is operational, the pull pin projecting into the second hole to engage the video display in a maintenance position allowing operator access to the interior area.

20. The gaming machine of claim 19, wherein the first hole is located at a calculated distance from the first trunnion, and wherein the second hole is located at the calculated distance from the first trunnion ninety degrees from the first hole.

21. The gaming machine of claim 20, wherein the calculated distance is based on a size of the first trunnion bracket.

22. The gaming machine of claim 19, wherein the gaming machine further comprises a trunnion base attached to a portion of the side interior surface, and wherein the first trunnion support and the second trunnion support are rigidly attached to the trunnion base.

23. The gaming machine of claim 19, wherein the second trunnion support comprises a bearing pocket having an inner race and an outer race separated by a plurality of ball rollers, the inner race allowing the video display to pivot around the center vertical rotating axis when the pull pin is disengaged from the first trunnion bracket.

24. The gaming machine of claim 19, wherein the video display is pivoted ninety degrees around the center vertical rotating axis after the pull pin is disengaged from the first hole to allow the pull pin to project into the second hole.

25. The gaming machine of claim 19, wherein the video display is selected from the group consisting of a flat panel cathode ray tube, a plasma display, a liquid crystal display and an organic liquid crystal display.

26. The gaming machine of claim 19, further comprising a controller, the controller operatively coupled to the video display and a value input device of the gaming machine, the controller comprising a processor and a memory coupled to the processor of the controller, the controller being programmed to:

detect a wager for game play at the gaming machine;

cause a video image representing an outcome of the game play to be displayed on the video display; and determine a value payout associated with the outcome.

27. The gaming machine of claim 19, wherein the gaming machine is selected from the group consisting of a mechanical slot machine, a video slot machine, a video poker machine, a video blackjack machine, a video keno machine and a video bingo machine.

28. A gaming machine with a trunnion mounted video display, the gaming machine comprising:

a video display having a front panel, the front panel displaying video images associated with a wagering game at the gaming machine;

a first trunnion bracket attached to a first side panel of the video display, the first trunnion bracket having a first trunnion disposed thereon at a center horizontal rotating axis of the video display and having a hole disposed therein;

a second trunnion bracket attached to a second side panel of the video display, the second trunnion bracket having a second trunnion disposed thereon at the center horizontal rotating axis, the second trunnion projecting in a horizontal direction opposite the first trunnion, the second side panel substantially parallel to the first side panel, the video display being between the first and second trunnion brackets;

a first trunnion support coupled to a bottom interior surface of a housing frame characterizing an interior area of the gaming machine, the first trunnion support having a first aperture disposed therein, the first aperture sized to receive the first trunnion when the video display is mounted in the housing frame;

a second trunnion support coupled to the bottom interior surface, the second trunnion support having a second aperture disposed therein, the second aperture sized to receive the second trunnion when the video display is mounted in the housing frame;

a first pull pin mounted on the first trunnion support, the first pull pin adapted to project into the hole to engage the video display in a game play position while the wagering game is being played and the video display is operational; and a second pull pin mounted on the first trunnion support at a location disposed apart from the first pull pin, the second pull pin adapted to project into the hole to engage the video display in a maintenance position allowing operator access to the interior area.

29. The gaming machine of claim 28, wherein the gaming machine further comprises a trunnion base attached to a portion of the bottom interior surface, and wherein the first trunnion support and the second trunnion support are rigidly attached to the trunnion base.

30. The gaming machine of claim 28, wherein the first pull pin is located at a predetermined distance from the first aperture, and wherein the second pull pin is located at the predetermined distance from the first aperture ninety degrees from the first pull pin.

31. The gaming machine of claim 28, wherein after the first pull pin is disengaged from the hole, the video display is pivoted ninety degrees around the center horizontal rotating axis to allow the second pull pin to project into the hole.

32. The gaming machine of claim 28, wherein the video display is selected from the group consisting of a flat panel cathode ray tube, a plasma display, a liquid crystal display and an organic liquid crystal display.

33. The gaming machine of claim 28, further comprising a controller, the controller operatively coupled to the video display and a value input device of the gaming machine, the controller comprising a processor and a memory coupled to the processor of the controller, the controller being programmed to: detect a wager for game play at the gaming machine; cause a video image representing an outcome of the game play to be displayed on the video display; and determine a value payout associated with the outcome.

34. The gaming machine of claim 28, wherein the gaming machine is selected from the group consisting of a mechanical slot machine, a video slot machine, a video poker machine, a video blackjack machine, a video keno machine and a video bingo machine.

35. A gaming machine for conducting a wagering game, comprising:

a housing;

a video display contained in the housing; and a trunnion arrangement for mounting the video display to the housing, the trunnion arrangement including a trunnion coupled to the video display and allowing for rotation about an axis of the video display between a game play position and a maintenance position, the trunnion arrangement including: a trunnion bracket having the trunnion disposed thereon at the axis; a first hole and a second hole disposed in the trunnion bracket; a trunnion support mounted to the housing, the trunnion support configured to receive the trunnion; and a pin structure to lock the video display in the maintenance position allowing operator access to an interior area of the housing, the pin structure being disposed in the trunnion support and configured to project into the first hole to engage the video display in the game play position and to project into the second hole to engage the video display in the maintenance position allowing operator access to the interior area of the housing.

* * * * *